United States Patent
Shields et al.

(10) Patent No.: US 8,879,631 B2
(45) Date of Patent: Nov. 4, 2014

(54) TEMPORALLY SMOOTHING A MOTION ESTIMATE

(75) Inventors: Jerome D. Shields, San Francisco, CA (US); Christopher J. Orlick, San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 309 days.

(21) Appl. No.: 12/745,501

(22) PCT Filed: Nov. 21, 2008

(86) PCT No.: PCT/US2008/084393
§ 371 (c)(1),
(2), (4) Date: May 28, 2010

(87) PCT Pub. No.: WO2009/070508
PCT Pub. Date: Jun. 4, 2009

(65) Prior Publication Data
US 2010/0321583 A1 Dec. 23, 2010

Related U.S. Application Data

(60) Provisional application No. 60/991,675, filed on Nov. 30, 2007.

(51) Int. Cl.
*H04N 7/18* (2006.01)
*G06T 7/20* (2006.01)
(52) U.S. Cl.
CPC ......... *G06T 7/20* (2013.01); *G06T 2207/30241* (2013.01)
USPC .................................. 375/240.16; 375/240.17
(58) Field of Classification Search
CPC .. H04N 7/26888; H04N 7/26058; H04N 7/50
USPC ................. 375/240.01–240.29; 348/699–702
See application file for complete search history.

(56) References Cited

U.S. PATENT DOCUMENTS

| 5,557,684 A | 9/1996 | Wang et al. |
| 5,793,429 A | 8/1998 | Kim et al. |

(Continued)

FOREIGN PATENT DOCUMENTS

| EP | 1 755 342 A1 | 2/2007 |
| WO | WO 00/07375 A1 | 2/2000 |

(Continued)

OTHER PUBLICATIONS

Denshi Joho Tsushin et al. "The IEICE Transactions on Fundamantals of Electronics, Communications and Computer Sciences", Mar. 2006 vol. J89-A No. 3, Original Japanese document plus English translation, 25 pages.

(Continued)

*Primary Examiner* — Andy Rao
(74) *Attorney, Agent, or Firm* — Hickman Palermo Truong Becker Bingham Wong LLP; Kirk D. Wong

(57) ABSTRACT

For a frame set of a moving image sequence, a motion estimate is accessed. The motion estimate describes a change to a region of a reference frame with respect to at least one other frame. The reference frame and the other frames are displaced from each other within the frame set from over a temporal window. The regions of the two frames contain at least a portion of an image feature. The motion estimate is smoothed over the temporal window. The smoothing may facilitate aligning, at least in part, the image feature within the set of frames.

22 Claims, 9 Drawing Sheets

(56) References Cited

U.S. PATENT DOCUMENTS

| | | | |
|---|---|---|---|
| 5,825,421 A | 10/1998 | Tan | |
| 5,886,744 A * | 3/1999 | Hannah | 375/240.16 |
| 6,037,988 A | 3/2000 | Gu et al. | |
| 6,075,875 A | 6/2000 | Gu | |
| 6,212,235 B1 | 4/2001 | Nieweglowski et al. | |
| 6,480,615 B1 | 11/2002 | Sun et al. | |
| 6,487,304 B1 | 11/2002 | Szeliski | |
| 6,526,156 B1 | 2/2003 | Black et al. | |
| 6,707,854 B1 | 3/2004 | Bonnet et al. | |
| 6,766,037 B1 | 7/2004 | Le et al. | |
| RE39,455 E | 1/2007 | Tan | |
| 7,158,680 B2 | 1/2007 | Pace | |
| 7,480,334 B2 * | 1/2009 | Nair | 375/240.16 |
| 2005/0094852 A1 | 5/2005 | Kumar et al. | |
| 2005/0243921 A1 | 11/2005 | Au et al. | |
| 2005/0276323 A1 | 12/2005 | Martemyanov et al. | |
| 2006/0029253 A1 | 2/2006 | Pace | |
| 2006/0280252 A1 | 12/2006 | Kwon et al. | |
| 2007/0041445 A1 | 2/2007 | Chen et al. | |

FOREIGN PATENT DOCUMENTS

| | | |
|---|---|---|
| WO | WO 01/22733 A1 | 3/2001 |
| WO | WO 01/45420 A1 | 6/2001 |
| WO | WO 01/45421 A1 | 6/2001 |
| WO | WO 03/055228 A1 | 7/2003 |

OTHER PUBLICATIONS

International Preliminary Report on Patentability received in international patent application No. PCT/US08/84393, dated May 21, 2011, 3 pages.

Claims as of Jul. 20, 2011 in international patent application No. PCT/US08/84393, 6 pages.

Licsár, Attila, et al., "Adaptive Stabilization of Vibration on Archive Films", N. Petkov and M.A. Westenberg, editors; CAIP 2003, LNCS 2756, pp. 230-237, Copyright Springer-Verlag Berlin Heidelberg 2003, 9 pages.

* cited by examiner

Example Procedure
400

For a Set of Frames of a Video Sequence, Access a Parameterized Motion Estimate that Describes a Change to a Region of a 1st Frame of the Set with respect to a corresponding Region of a 2nd Frame, which is Displaced within the Frame Set from the 1st Frame over a Temporal Window (each of the corresponding regions containing at least a part of an Image Feature)
401

Smooth the Parameterized Motion Estimate over the Temporal Window, such that the Image Feature is Aligned, at least in Part, within the Frame Set over a Temporal and/or Spatial Attribute
402

FIG. 4

TEMPORALLY SMOOTHING A MOTION ESTIMATE

TECHNOLOGY

The present invention relates generally to video processing. More specifically, embodiments of the present invention relate to temporally smoothing a motion estimate.

BACKGROUND

Image processing applications may estimate motion associated with various features in the image frames of a moving image sequence. The applications may estimate motion associated with blocks, segments, or other regions which may contain features. The estimated motion may describe a spatial transformation of a feature or region, from one frame to another. The transformation may describe a translation, rotation, warp, or other spatial transformation. The estimated motion may describe a non-spatial transformation of a feature or region. The transformation may describe intensity or color change, blurring, or other non-spatial transformation. As used herein, the terms 'motion estimates' and 'motion estimation' may refer to such estimates of motion. As used herein, the terms 'features', 'blocks', 'segments' and 'regions' may refer to that characteristic of the moving images to which the motion estimate is associated. As used herein, the term 'region' may refer to a block, segment, or other distinct area of an image frame, which may contain one or more features of an image.

Motion estimates are used in applications that relate to video, computer imaging, medical imaging and other somewhat more specialized image processing applications. Motion estimates are used with two dimensional (2D) imaging applications, as well as with three dimensional (3D) applications. Herein, the terms 2D and 3D refer to spatial dimensions.

Applications may include or involve video compression, which relates to reducing the amount of data with which visual information is stored and conveyed (e.g., encoded, transmitted, received and decoded). Motion estimates are used with video compression applications to achieve significant reduction in the data needed to represent image frames in moving image sequences. A video compression application may attempt to map, from one frame to another, translational or other motion of image regions. For instance, given a reference frame A and a motion map that describes image motion from frame A to a subsequent frame B, a motion-predicted frame $B_m$ can be formed by projecting the motion map from frame A. A difference frame $B_d$ can be formed by subtracting the motion-predicted frame $B_m$ from frame B. Compression is achieved when the amount of data needed to encode both the motion map and the difference frame $B_d$ is less than the amount needed for encoding frame B directly. Thus, an application may seek a motion map that yields a motion-predicted frame $B_m$ that differs relatively little from frame B. For compression related purposes, the accuracy with which the motion map represents the actual motion of image features in the moving image sequence may not be a primary consideration. In other words, from the perspective of achieving compression, it may suffice that a given motion map simply reduces the amount of data needed to encode the motion map and the difference frame $B_d$.

Applications that use motion estimation may align an image feature which appears in one or more frames of a moving image sequence, to a reference. A motion estimate may describe the motion of a region containing a feature as it moves over a set of frames temporally proximate to a reference frame. The motion estimate may describe the transformation of the region from the reference frame to each of the other frames in the set. To align the feature from each frame, an inverse transformation may be applied to the related region of each other frame to reverse or undo the motion described by the motion estimate. The resulting set of image feature-aligned regions may then be blended or combined with each other, according to a formula. As used herein, the term 'align' may relate to inverting or undoing motion described by a motion estimate for a region containing a feature, persisting in one or more frames, to align the feature in each frame with the same feature in a reference frame. For applications that align image features, the accuracy with which the motion estimate represents the actual motion of image features in the moving image sequence is a primary consideration. Accurate motion estimation can be significant for accurately aligning features between various frames of a moving image sequence.

The importance of motion estimation accuracy becomes apparent with applications for which precise inter-frame alignment of image features is significant. These applications may include super-resolution, frame-rate conversion, motion-compensated de-interlacing and motion-compensated noise reduction. For super-resolution applications, relatively precise alignment, and thus accurate motion estimation, may become particularly significant. The significance of accurate motion estimation is not limited to such applications, however. It should be appreciated that accurate motion estimation may be significant with virtually any 2D or 3D video, medical imaging and computer imaging application.

In an example motion estimation approach, a motion estimate describing frame-to-frame translational motion of image regions may be found for an image sequence. To find the motion estimate for the sequence, a motion estimate is found for each region of each frame of the sequence. For a particular region, the frame containing the region is the reference frame and the motion estimate describes motion of the region over a set of frames temporally proximate to the reference frame. A region C may be selected in the reference frame and a likely position for a related region C', having the same image features, may be sought in another frame of the frame set. In seeking the C' region, region C may be translated over some range to many different positions and compared to regions at those positions in the other frame. The region found to be most like translated region C is region C'. As this process is repeated for each other frame of the set, the motion estimate for the region is found. For a 2D image, a translation may be represented by two components, e.g., an "x" component and a "y" component. The two components taken together may be referred to as a motion vector. One motion vector may be found for each frame of the set. By ordering the motion vectors for each frame of the set according to each frame's temporal position within the set, two discrete functions of the variable "t" (time) can be formed, e.g., x(t) and y(t). The two functions correspond to the two components of motion. The two functions, taken together, are the motion estimate for the region and they detail the translational motion of the region over the set of frames. It should be understood that, in this example, translational motion, represented by two components, is described.

For an example of more complicated motion, describing, e.g., translation, rotation, warp, and intensity change, regions are transformed from one frame to another and more than two components are needed to represent the motion. Again using regions C and C' to represent related regions in two frames, region C of the reference frame may be transformed over some range of all of its components and compared to regions in the other frame. Again, the region found to be most like transformed region C is region C' and the process is repeated for each frame of the set. The transformation described may be represented with seven components. The components taken together may be referred to as a motion vector. By ordering the motion vectors according to each frame's temporal position within the set, seven discrete functions of the variable "t" (time) can be formed. The seven functions, taken together, are the motion estimate for the region and they detail the complicated motion of the region over the set of frames.

More generally, motion estimation refers to a description (e.g., quantitative) of how motion vectors and/or other motion estimates map a region of a reference frame to one or more other frames. The regions may be distinct spatially. The motion estimate relates a region of the reference frame to regions of other frames, e.g., within a temporally proximate window about the reference frame. For each region in the reference frame, a search for similar regions may be performed on one or more other frames, which may be located within some displacement (e.g., a certain number of frames, temporal distance) from the reference frame. As used herein, the term 'motion estimate' may refer to motion estimates comprised of any number of component functions with any particular component describing a spatial or non-spatial attribute of the motion. As used herein, the term 'motion estimate' may refer to components that are sampled over time, e.g., over a set of frames defining a temporal window; the samples or frames may or may not be equally spaced in time. The components may be sampled over another variable, provided that the motion estimate is described over that variable, e.g., sampled over distance or temperature.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 depicts a flowchart for a first example procedure, according to an embodiment of the invention;

DESCRIPTION OF EXAMPLE EMBODIMENTS

Figure 1A:
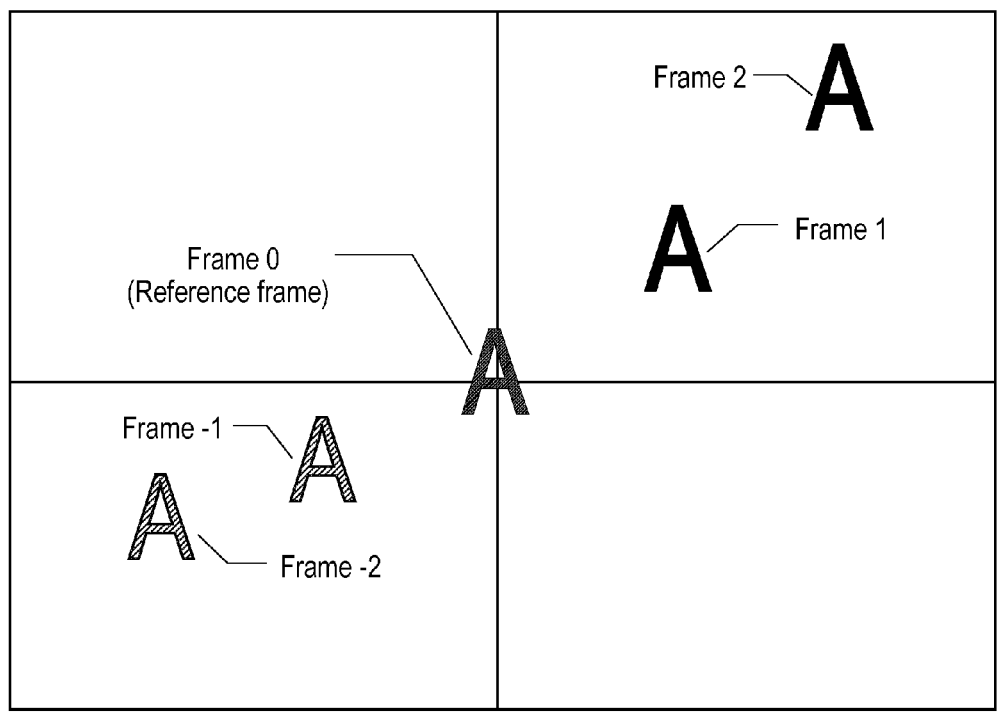
FIG. 1A depicts an example moving image sequence, with which an embodiment of the invention may be practiced.

Motion estimates may have aberrations, e.g., they may vary in accuracy with which they predict motion. The variance may result from a particular approach with which the motion is estimated or from one or more characteristics of a particular image sequence, such as noise, aliasing, process artifacts and the like. Due to these inaccuracies, motion estimates may be accompanied by a measure of the likelihood or confidence that the motion estimate is accurate. For a motion estimate that describes motion of a region over a set of frames, a separate confidence value for each frame (e.g. for each motion vector) may accompany the estimate. By ordering the confidence values according to each frame's temporal position within the frame set, a function of the variable "t" (time) can be formed. As used herein, the term 'confidence' may refer to an indicator of the likelihood, confidence, probability, or accuracy of a motion estimate. As used herein, the terms 'confidence values', 'confidence functions' and 'confidence' may refer to a function of confidence that accompanies a motion estimate. As used herein, motion estimates may be assumed to comprise an accompanying confidence function.

Example embodiments for temporally smoothing a motion estimate are described herein. In the following description, for the purposes of explanation, numerous specific details are set forth in order to provide a thorough understanding of the invention. It will be apparent however, that the invention may be practiced without these specific details. In other instances, well-known structures and devices are not described in exhaustive detail, to avoid unnecessarily obscuring the invention.

Overview

An embodiment relates to temporally smoothing a motion estimate. For a frame set of a moving image sequence, a motion estimate is accessed. The frame set defines a temporal window of the sequence. The motion estimate describes a transformation of a region of a reference frame of the set with respect to at least one other frame in the set. Regions of the reference frame and the other frames may each contain a portion of an image feature. The motion estimate is smoothed over the temporal window. PCT Application number [yet to be assigned], filed on Nov. 21, 2008, by and Christopher J. Orlick, Jerome D. Shields, Richard Webb and Scott Miller, which is entitled "Temporal Image Prediction," is incorporated herein for all purposes. The smoothing operation may smooth each component of motion independently. An accompanying confidence function may not be smoothed. The smoothing facilitates, at least in part, more accurate alignment of the same image feature from each frame. The motion estimate for a moving image sequence is smoothed by smoothing the motion estimate for each region of each frame of the sequence.

Example embodiments described herein relate to temporally smoothing a motion estimate. A moving image sequence comprises multiple frames. The frames of the sequence are presented at a certain frame rate, which may describe a temporal dimension for the sequence. A given set of frames of the moving image sequence may thus be considered a temporal window within the sequence. The frames within a temporal window may include a reference frame, to which motion over the other frames of the window may be referenced. The motion estimate describes motion over the set of frames that defines the temporal window.

Within a relatively small temporal window of frames, motion associated with an actual image feature may be considered to have a smooth characteristic. For a small temporal window of frames, estimates of motion for particular regions or image features that appear to be other than smooth temporally may be considered to be inaccurate or erroneous. A motion estimate that is other than smooth temporally may impair accurate alignment of the features of the frames in the window. An embodiment temporally smoothes motion estimates and thus facilitates improved alignment among image features.

In some moving image sequences or frame sets, another motion characteristic, e.g., other than smooth, may combine with a smooth motion characteristic. For instance, frame jitter or film cadence characteristics may combine with the smooth motion characteristic. Where another motion characteristic and a smooth motion characteristic are compounded in this way, frames may show an overall compound motion characteristic. However, smooth motion may still be considered to be an underlying characteristic of the compound motion.

In an embodiment, a motion estimate may have or be described with one or more components. For instance, a motion estimate for a frame region may include a pair of functions of orthogonally related vector components, such as horizontal and vertical, 'x' and 'y', or the like. The component functions may describe translational motion that is associated with the region over the frame set.

The motion estimate may include a function of a rotational or angular movement component, such as an angle θ (theta), with respect to a point in a region of the reference frame about which the rotational motion occurs. The angular component function describes rotational motion associated with the region over the frame set. An angular component function may be included with a translational component, such as the pair of functions of orthogonally related vector components (e.g., 'x' and 'y').

Motion estimates may include more numerous component functions. For instance, the motion estimate may include at least six functions, which describe affine motion, such as warping and translation, which may be associated with the region over the frame set.

Example embodiments are described with reference to a motion estimate using two-component motion vectors to represent translational motion of image regions over a frame set within a 2D moving image sequence. It should be apparent however from the description that embodiments are not limited to these example features, which are used herein solely for uniformity, brevity, simplicity and clarity. On the contrary, it should be apparent from the description that embodiments are well suited to function with applications using any kind of motion estimates for any kind of motion. The embodiments are suitable for applications using 2D, 3D and various multi-dimensional images, and with imaging applications such as computer imaging and bio-medical imaging. In contrast to a 2D video application, a 3D biomedical imaging application may visually render a beating heart. A motion estimate for a sequence may use three-component motion vectors to represent translational motion, e.g., an 'x', 'y', and depth or 'z' component.

Example embodiments that smooth a motion estimate for a region may be described. Smoothing the estimate for a region may be viewed as a distinct operation. Repeating the operation for every region of every frame of a sequence, smoothes the motion estimate for the sequence. Herein, any example embodiment that describes smoothing a motion estimate for a region may be used to smooth other regions of the same or other frames for the purpose of smoothing the motion estimate for a single frame or a complete sequence.

The motion estimate describes motion over time (or some other variable) and each component may be viewed as a single-valued function of time. The components may also be viewed as functions of another variable, provided that the motion estimate is described over that variable, e.g., over distance or temperature. For instance, in an embodiment, the motion estimate describes motion over the window with respect to an independent variable. The independent variable may relate time, distance, temperature, and/or another property over which motion within the moving image sequence is associated. Frames of the frame set may be substantially spaced periodically over the window, or may be spaced other than substantially periodically over the window. In an embodiment, the functions of each component of a region may be smoothed independently. Functions of two different components may be smoothed jointly. A function may be smoothed by low-pass filtering, or by fitting a curve such as a parabola or splines, or by some other smoothing method. An accompanying confidence function may be used as a weighting function for filtering, curve fitting, or other method. Confidence functions are not smoothed. Motion estimates for different regions may be smoothed by different methods, and different component functions of an estimate for a region may be smoothed by different methods.

In an embodiment, for a set of frames of a moving image sequence, a motion estimate is accessed. The motion estimate associates each frame in the set with a value of an independent variable. The motion estimate also describes a change to a region of a frame in the set with respect to at least one other frame in the set, as a function of the independent variable. The motion estimate is smoothed over the independent variable.

In an embodiment, for a region of a frame of a moving image sequence, a motion estimate is accessed. The motion estimate describes the motion of the region over a subset of a set of frames. The motion estimate also associates each frame in the set with a value of an independent variable. Further, the motion estimate describes a change to the region of the frame in the set with respect to at least one other frame in the set as a function of the independent variable. The motion estimate is smoothed over the independent variable.

In an embodiment, the smoothing facilitates aligning, at least in part, an image feature present in more than one frame in the set of frames. The independent variable may relate to at least one of time, frame number, distance, temperature or another property over which motion may be described. The motion estimate may include multiple component functions. The component functions may include at least one of a translational component function that describes translational motion, an angular component function that describes rotational motion, affine component functions that describe affine motion, a color component function that describes a color change, or a resolution component function that describes a spatial resolution change.

In an embodiment, the steps are repeated for all regions of a frame to smooth the entire motion estimate for the frame. In an embodiment, the steps are repeated for all frames of a moving image sequence to smooth the entire motion estimate for the sequence.

An embodiment facilitates alignment of an image feature that appears in multiple frames of a moving image sequence. For a frame set of the sequence, a motion estimate is accessed. The motion estimate describes a transformation of a region of one frame of the set, the reference frame, to each other frame in the set. The frame set defines a temporal window of the sequence. The related regions of the frames may contain at least a portion of the same image feature. The motion estimate is smoothed over the temporal window. The smoothing facilitates, at least in part, the alignment of image features from each frame of the set. The image feature from each frame is aligned with the image feature in the reference frame.

Smooth Translational Motion Example

A motion estimate for a region of a frame may include a pair of functions of orthogonally related vector components, such as horizontal and vertical, 'x' and 'y', etc. Based on a first motion estimate, a first component function and a confidence function are assigned for each of two orthogonally related components, such as, of a set of motion vectors for a moving image sequence. For frames within a temporally defined window about a reference frame, the motion of actual image features is assumed to be smooth. The window may be defined to cover, for instance, a short period of time or a small number of frames. However, any other temporally significant period may define the window.

Within the temporally defined window, a second motion estimate for the region is determined from the first motion estimate, based on the assumption of smoothness. The second motion estimate is determined by smoothing the first estimate. A second component function for each of the two orthogonally related components of the set of motion vectors is assigned based on the second motion estimate.

In an embodiment, the motion estimate may be smoothed by filtering the orthogonal components of the motion vectors, as for instance with low-pass filtering. In another embodiment, splines or a parabola (or some other smoothly sloping curve) may be fitted to the motion estimate to form the smoothed second motion estimate. An accompanying confidence function may be used as a weighting function for filtering, curve fitting, or other method.

The example embodiments described herein facilitate alignment of image features in a moving image sequence. Moreover, the example embodiments may thus enhance visual quality attributes of features in a moving image sequence.

Example procedures described herein may be performed in relation to aligning an image feature in a moving image sequence by smoothing a motion estimate associated therewith. Procedures that may be implemented with an embodiment may be performed with more or less steps than the example steps shown and/or with steps executing in an order that may differ from that of the example procedures. The example procedures may execute on one or more computer systems, which may be under the control of machine readable instructions encoded in one or more computer readable storage media.

An aberration in an original motion estimate may be ameliorated. The original motion estimate may be determined as follows. Image sequences may be analyzed to estimate motion therein. A region in a reference frame may be selected and its "most likely" position sought in another, e.g., subsequent or previous frame. A measure of relative likelihood, that the region is at a particular position, is used in the search to find the most likely position. For every region in the reference frame, the search is performed on each frame in a set of other frames, located for instance within a predefined (e.g., small) temporal distance from the reference frame. Some measure of confidence in the most likely positions found may be determined. A motion estimate for the reference frame is thus provided.

FIG. 1A depicts an example moving image sequence 100, with which an embodiment of the invention may be practiced. For each other frame, a search produces the most likely position for the region containing the feature and the position is recorded in the motion estimate. FIG. 1A depicts a position of an image feature, the letter 'A', as it moves, or is displaced in spatial position among the frames, over a five-frame interval 100.

Figure 1B:
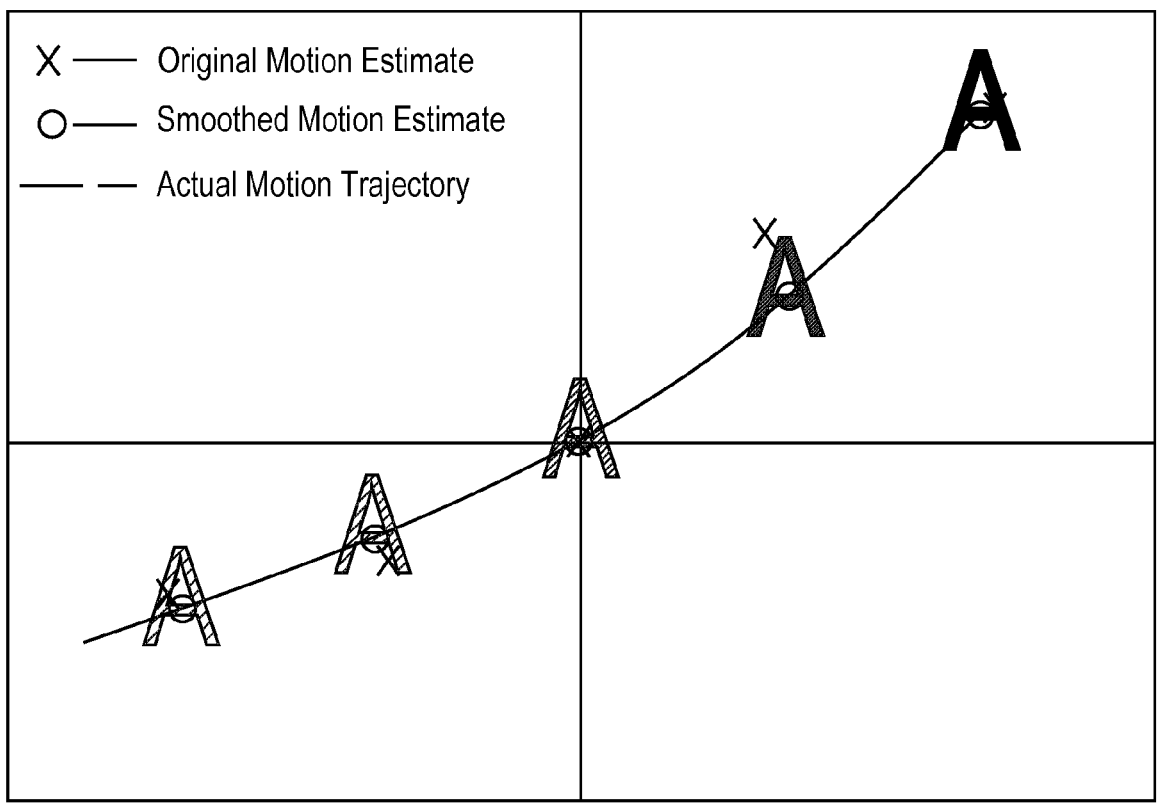
FIG. 1B depicts an example motion estimate, according to an embodiment of the invention.

FIG. 1B depicts example motion estimate 100, according to an embodiment. FIG. 1B depicts the same moving feature 'A' with positions recorded in the motion estimate indicated by X's. A position in any one frame is found independently of the others.

Figure 2A:
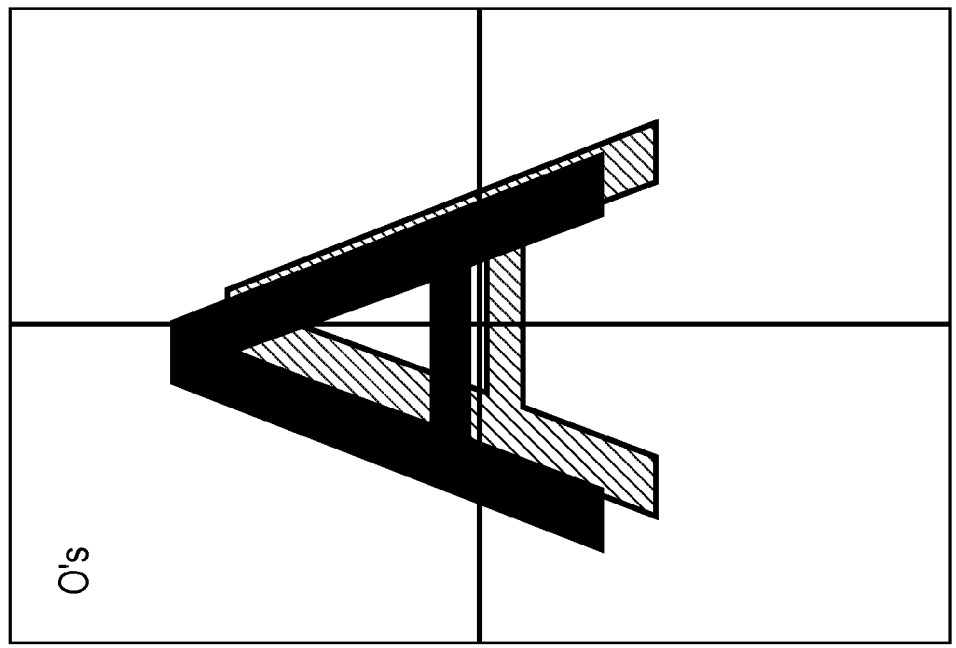
FIG. 2A depicts an example multi-frame image feature alignment by a motion estimate, with which an embodiment of the invention may be practiced.

FIG. 2A depicts an example multi-frame image feature alignment 201 by a motion estimate, with which an embodiment may be practiced. In FIG. 2A, the image features from each frame are aligned to the reference according to the motion indicated by the X's. Image features may be misaligned, due for instance to errors in each independent search. Errors estimating motion may cause motion estimates to deviate from smooth motion trajectories. Errors that may otherwise occur in the motion estimation are removed by the smoothing operation of the present embodiment, yet actual motion of image features is not changed therewith. More accurate motion estimation is achieved by smoothing the original motion estimate.

The motion estimate may be smoothed by considering the position of a matching region relative to its positions in all other frames within the selected temporal window, and not simply the most likely position of the matching region in each searched frame. FIG. 1B depicts the positions found by smoothing the motion estimation, as indicated by O's, for the estimated trajectory of the image feature 'A'. In this example, the actual motion of the 'A' is assumed to be smooth.

Figure 2B:
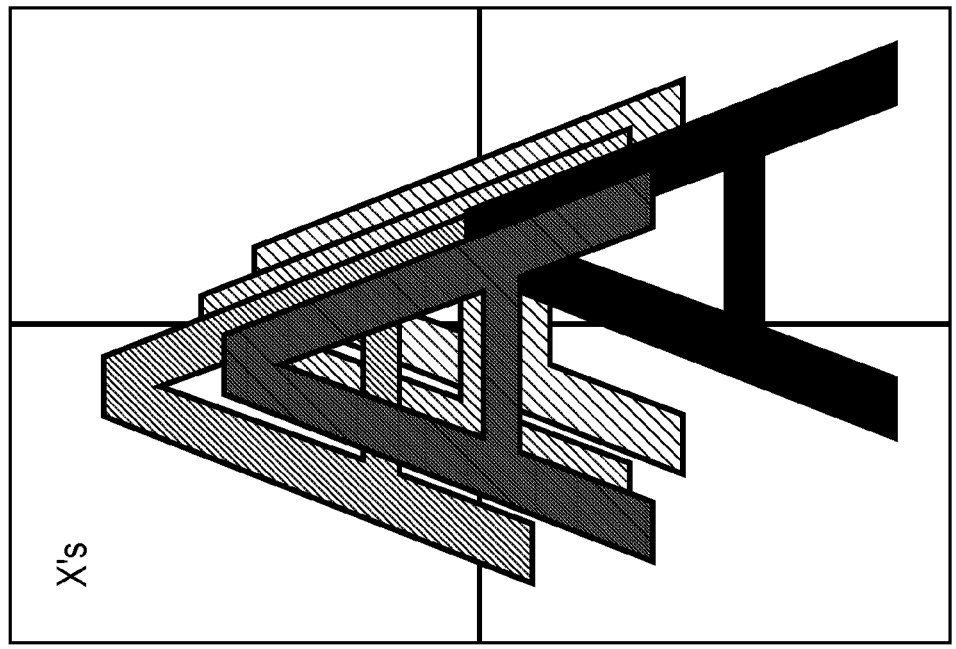
FIG. 2B depicts an example alignment of an image feature, according to an embodiment of the invention.

FIG. 2B depicts an example alignment 212 of image feature 'A', according to an embodiment. In FIG. 2B, the image feature 'A' from each frame is aligned to the reference according to the smooth motion indicated by the O's used in FIG. 1B. Smoothing the motion estimate may thus improve the alignment 212 of the image feature 'A' in comparison for example with alignment 201 (FIG. 2A).

Moreover, after the image features are aligned in an embodiment, the image regions containing the features are blended according to a predetermined formula. The purpose of aligning and blending the features is to improve image quality however, rather than improving the image quality, blending misaligned features can pose the risk of significant image quality degradation. In an embodiment, a formula for blending gives a weight to each aligned image feature based on the likelihood, confidence, or similar probability factor that each of the features is at the particular predicted position.

An embodiment blends image features when confidence is high. Where the positions are found independently, confidence values are determined independently as well. Where the smoothed motion estimate is used to align the image features however, the confidence for each position increases because the positions agree with each other. With reference to FIG. 1B and FIG. 2B, consideration of the relative positions of the image features shows that the aligned O positions found do not necessarily match the X positions, which were determined with the measure of relative likelihood used by the independent searches. Examining the relative likelihood measure at the contrasting X and O positions may be expected to show some differences. Search imperfections and/or image characteristics such as noise, aliasing, and process artifacts may cause the independent searches to marginally favor the X positions.

By smoothing the motion estimate and thus moving the positions found from the X's to the O's, the measure of relative likelihood may decrease and confidence may thus also decrease. However, an embodiment offsets this decrease with an even greater confidence increase, due to the agreement of positions obtained by the smoothing operation. Increased alignment accuracy is accompanied by an appropriate concomitant increase in confidence associated with the alignment.

The usefulness of a smoothed motion estimate is related to how closely the smoothed estimate agrees with the motion of the actual image features in a moving image sequence. Sometimes there may be disparity therewith. The disparity may be ameliorated by repeating, in part, the motion estimation process for an image sequence, as discussed below with reference to FIG. 5. The process of determining a motion estimate may have a significant associated computational cost, which may make repeating the process uneconomical in some applications. Also, an application for which high quality motion estimates may be useful may not have control over one or more processes with which motion is estimated. Thus, the quality of an existing motion estimate may be a given value for such applications. An embodiment however improves the quality of the motion estimate by temporally smoothing an existing motion estimate, which can thus be useful in such applications.

An existing motion estimate for translational motion in a moving image sequence may comprise multiple sets of translational motion vectors. For an estimate of the translational motion, every frame in the moving image sequence is segmented into substantially rectangular blocks of pixels. Each of the blocks has an associated set of motion vectors. The motion vectors describe the motion of the block over some of the frames of the moving image sequence. A frame containing a block is considered a reference frame for the block's set of motion vectors.

The set of motion vectors has a vector for each other frame located within the given temporal distance from the reference frame. For a given block, each vector in a motion vector set indicates a calculated most-likely position of a related block-sized region in one other frame, relative to the position of the corresponding block in its reference frame. The most likely position to which a block moves in another frames (or from which the block moved in a previous frame) is determined by searching the other frame for a block-sized region that contains image features that best match the features in the block. To increase accuracy for some applications, positions in the various frames may be searched with sub-pixel precision. Where sub-pixel precision searching is used, an oversampling interpolator may be used. The oversampling interpolator creates the sub-pixel samples used for matching. For a set of vectors associated with a given block, the searches among the various frames of the moving image sequence are performed independently of the searches in the other frames.

The sum of absolute differences (SAD) of the corresponding pixel values (e.g., luminance/luma values and/or chrominance/chroma values) is used as the measure of matching for each block. A SAD of zero indicates an essentially perfect match. In contrast, a relatively large SAD may indicate a relatively poor match. In other embodiments, the measure of matching for the blocks may also or alternatively comprise a mean absolute difference (MAD) or a minimum mean square error (MMSE) calculation. Each vector may have an associated value indicating the confidence in the match. The confidence value may be derived from the SAD. The confidence value may be derived from a combination of the SAD and a measure of the amount of information contained in a block. Other confidence formulae may be used.

A formula used for calculating a confidence value may be given by Equation 1, below.

$$\text{Confidence} = 1/(1+K*\text{SAD}) \qquad \text{(Equation 1.)}$$

The constant 'K' of Equation 1 controls error tolerance. In the confidence calculations, a relatively good match is indicated where confidence tends toward one (or another significant value). Similarly, a relatively poor match is indicated where confidence tends toward zero (or another value that contrasts significantly with the value that indicates a good match).

The motion estimate is modified in an embodiment by processing each block's set of motion vectors individually. Upon processing the motion vector sets for all the blocks of every frame in a moving image sequence, the motion estimate is smoothed. For a block, the individual functions of each motion component (e.g., x and y) are smoothed independently of each other. Various processes may be used to smooth a motion vector set. These processes may include low-pass filtering of the original motion estimates or fitting splines or a parabola (or another smooth curve) to the original motion estimates. Confidence values may be used for weighting the motion vectors.

Figure 3A:
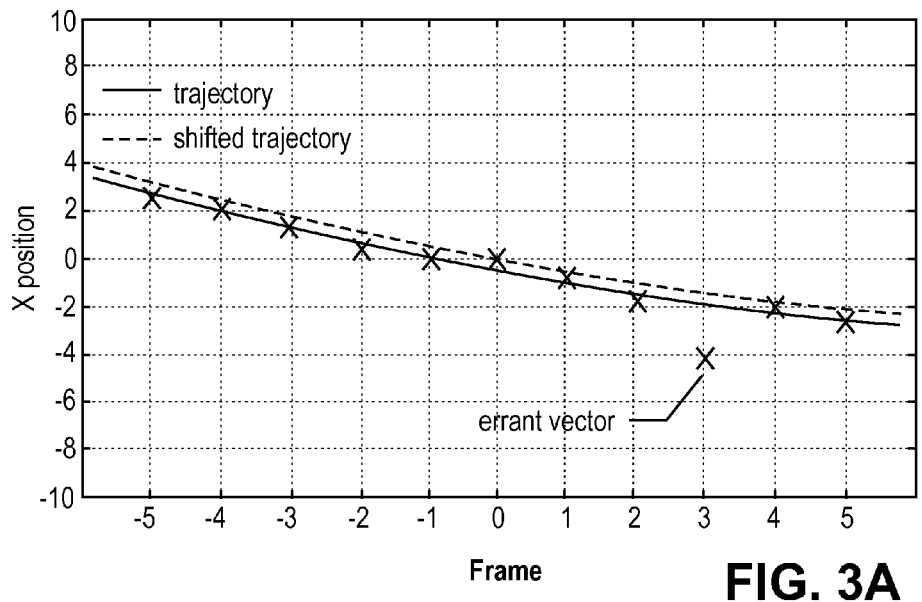
FIG. 3A depicts a plot of a set of example first components of a set of motion vectors, according to an embodiment of the invention.
Figure 3B:
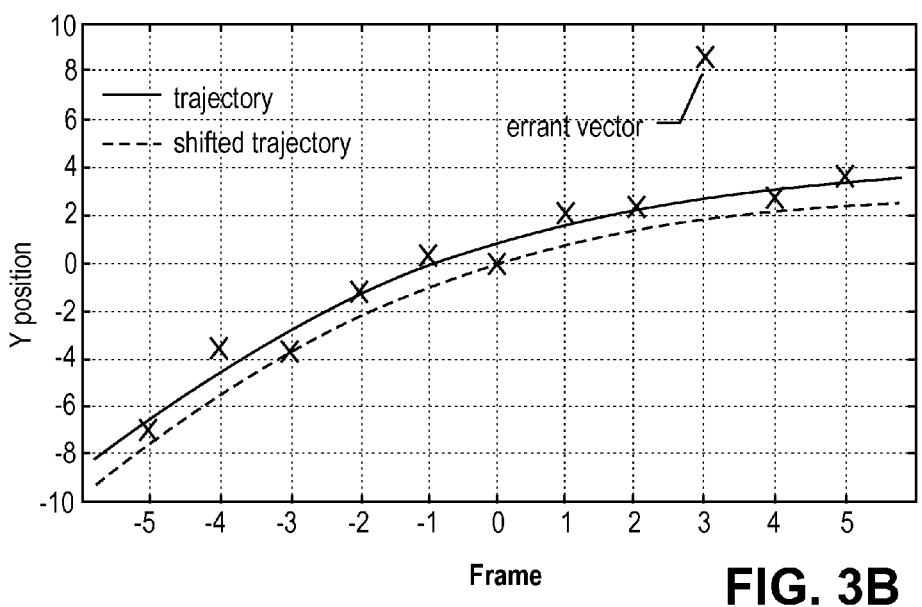
FIG. 3B depicts a plot of a set of example second components, which are orthogonal with respect to the first components, of a set of motion vectors, according to an embodiment of the invention.

According to an embodiment, FIG. 3A depicts a plot 300 of example first, e.g., horizontal (x) components of a set of motion vectors. FIG. 3B depicts a plot 350 of a set of example second, e.g., vertical (y) components, which are orthogonal with respect to the first (x) components, of a set of motion vectors. The values of the x and y components of the motion vectors are separately plotted respectively in plots 300 and 350 for 11 frames, which are centered about the reference frame. The X symbols indicate the positions found for the existing motion estimate. The x and y components of motion are plotted as functions of frame number (corresponding to time). The solid curves depict the trajectories produced by smoothing the functions. The dashed curves indicate the trajectories relative to the known position of the block in the reference frame. In other words, the dashed curve essentially represents the solid curve, displaced to pass through a location (0, 0) of the reference frame. A smoothed motion estimate is formed by replacing the original motion vectors in the set with those determined by the dashed curve. Where present, associated confidence values are also replaced. For instance, errors are newly calculated and new confidence values are derived. The alignment of the image features depicted in FIG. 2B may thus be achieved.

Example Procedures

Embodiments of the invention smooth a motion estimate using one or more procedures. Procedures that may be implemented with an embodiment may be performed with more or less steps than the example steps shown and/or with steps executing in an order that may differ from that of the example procedures. The procedures may execute with one or more components of a computer platform, such as that described below. The example procedures may execute on one or more computer systems, having one or more processors that function under the control of machine readable instructions encoded in one or more computer readable storage media. The execution of procedures described herein may, in various embodiments, involve software (including, e.g., one or more encoded algorithms), firmware, hardware and combinations thereof.

FIG. 4 depicts a flowchart for a first example procedure 400, according to an embodiment. In step 401, a motion estimate is accessed for a region of a frame of a video sequence. The motion estimate for the region describes motion of the region over a set of frames. The frame containing the region is the reference frame for the set and the frames in the set are temporally proximate to the reference frame. In step 402, the estimate is smoothed. An image feature appearing in the region may thus be aligned, as depicted in FIG. 2B. Procedure 400 may be repeated for each region of each frame of the sequence thus smoothing the motion estimate for the sequence.

Figure 5:
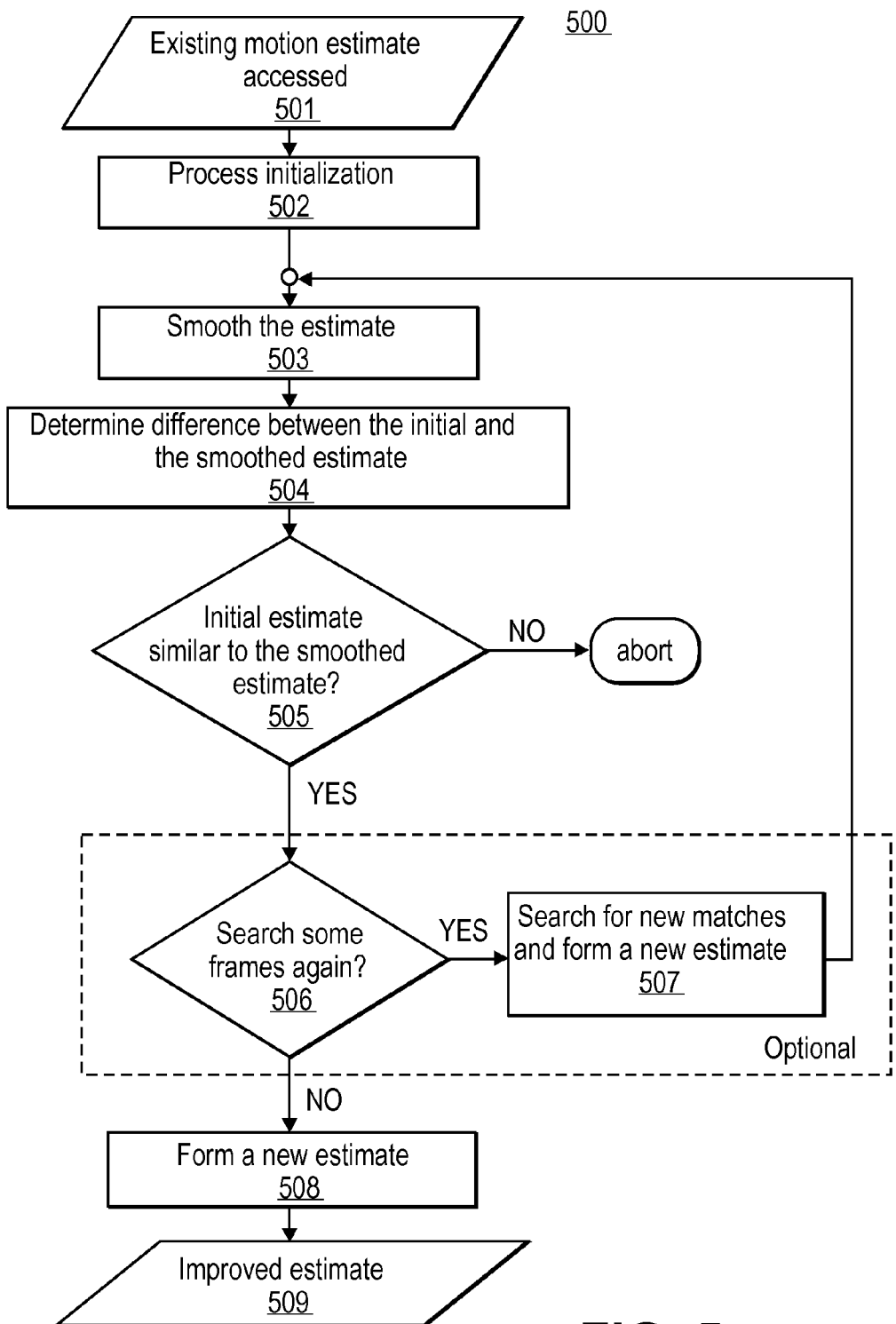
FIG. 5 depicts a flowchart for a second example procedure, according to an embodiment of the invention.

FIG. 5 depicts a flowchart for a second example procedure 500, according to an embodiment. In step 501, an existing motion estimate is accessed. From the existing motion estimate, horizontal and vertical x and y components of a motion vector set are assigned. Where present, original confidence values are assigned. Original confidence values may not be available however. For example, SAD information may not be available or confidence values were not deemed to be required. In such a case, single values, e.g., all ones, may be assigned as confidences. In an implementation, the orthogonally related vector set components from the existing motion estimate and the confidence values are assigned a designation, e.g., Current_X, Current_Y and Current_Confidence, e.g., for storage and processing. The current vector set components and the current confidence values are included for each frame of a frame set of the video sequence.

In step 502, a new estimate of the x and y components of the trajectory is formed by smoothing the current vector set components. In an implementation, the new estimate of the trajectory x and y components is assigned a designation, e.g., New_X and New_Y. Smooth motion is assumed, and in step 503, the new smoothed estimate is formed. The x and y component functions are smoothed independently of each other. In an embodiment, the current confidence value may be used, for weighting the position samples for filtering, curve fitting, or other smoothing action. With reference again to FIG. 3A and FIG. 3B, the X symbols represents the initial estimate and the dashed curve represents the smoothed estimate.

In step 504, a measure of the difference between the vector set components from the existing motion estimate and the vector set components of the new estimate is determined. The difference comprises a distance measurement in the image space and thus indicates the degree to which the positions of the vector set components from the existing motion estimate are shifted to form the new estimate. A corresponding value 'diff' for the difference is determined in an embodiment according to Equation 2 below, in which the differences in the x and y components for a particular frame are given by 'dx' and 'dy'.

$$\text{diff} = \sqrt{(dx^2 + dy^2)} \quad \text{(Equation 2.)}$$

In an implementation, the difference between the vector set components from the existing motion estimate and the new estimate of the vector set components is assigned a designation, e.g., New_Difference.

In step 505, it is determined, e.g., by examination of the magnitude of the difference value (e.g., New_Difference), whether the vector set components from the existing motion estimate (e.g., Current_X, Current_Y) are sufficiently similar to the smoothed estimate (FIG. 3A,B solid curve, not the dashed curve). The new estimate of the vector set components (e.g., New_X, New_Y) is smooth; thus the difference, New_Difference, is a strong indicator of the similarity of the existing motion estimate to the smoothed estimate. Where it is determined that the existing motion estimate is sufficiently similar to the smoothed estimate, justification exists for smoothing the existing motion estimate and procedure 500 may continue.

Thus in step 508, the new smoothed estimate is shifted to the known position of the block in the reference frame. For example, the shift is depicted in FIG. 3A and FIG. 3B by shifting the solid curve to the dashed curve. However, where it is determined that existing motion estimate is insufficiently similar to the smoothed trajectory, the smoothing operation is aborted for that block and the existing estimate is used; however, procedure 500 may proceed for the rest of the blocks.

The decision as to whether the existing motion estimate is sufficiently similar to the smoothed estimate may be processed by one of several techniques. In an embodiment, the number of difference value entries (e.g., in New_Difference) that are less than some distance threshold are simply determined. A logical acceptance variable is formed with each entry. The logical acceptance variable is designated New_Difference_Acceptable in an implementation. The logical acceptance value indicates 'true' if the corresponding difference value is less than the distance threshold. True logical acceptance variable entries may thus represent frames whose originally estimated positions are close enough to the smoothed estimate positions. If the number of true entries is high enough, the existing motion estimate is decided to be sufficiently similar.

For an example, reference is made again to FIG. 3A and FIG. 3B, in which, for a distance threshold having a value of two (2), all logical acceptance variable entries are true, with the exception of the entry at frame 3, which has an "errant" or outlying vector labeled. In a case in which concluding that the motion estimate is sufficiently similar to the smoothed estimate requires at least eight true entries, the existing motion estimate is shown to be sufficiently similar in plots 300 and 350.

Some system platforms with which procedure 500 executes may have sufficient computational resources and tasking flexibility for subsequent reexamination of the moving image sequence to be feasible. With a platform so capable, procedure 400 may optionally engage in such reexamination. Thus in step 506, it is determined whether some frames of the frame set are to be searched a subsequent time. For instance, it may be found that the logical acceptance variable has false entries for some frames, which indicate that the corresponding positions found in the existing motion estimate are beyond the distance threshold, e.g., excessively distant from the smooth motion estimate.

In step 507, the insufficiently close frames are searched again. In an embodiment, the insufficiently close frames are searched in a limited area. For example, the frames are searched near the smoothed motion estimate for the most likely position of a block-sized region that best matches the block in the reference frame. In each other frame within the temporal window, the search area is limited to a small local region that is centered about the positions indicated by the smoothed estimate and extends just beyond the distance threshold, which was used to determine the value for the logical acceptance variable.

The measure of a match and the assignment of confidence values proceed as described above with reference to steps 502 and 503. The subsequent positions found and confidences for the subsequently searched frames are assigned to the existing motion estimate and current confidence assigned, and procedure 500 returns to step 502. For a particular block's vector set, the initially unacceptably distant frames likely require no more than one subsequent search. With reference again to FIG. 3A and FIG. 3B for example, frame 3 is searched again and a new best match position found near the smoothed estimate.

Where it is determined in optional step 506 that no frames are to be searched subsequently (or where step 506 is not opted for, upon determining in step 505 that the initial motion estimate is sufficiently similar to the smoothed estimate), the new smoothed estimate is shifted to the known position of the block in the reference frame, as represented in FIG. 3A and FIG. 3B for example, by shifting the solid curve to the dashed curve.

Some frames however may still have false logical acceptance variable entries. In an embodiment, the confidence entries that correspond to these frames are assigned zero values. In block 509, the set of vectors for the block is replaced with values from the new smoothed estimate and the associated confidence values, if present, are replaced, thus improving the motion estimate. The modified vector set may be used to align and blend the image regions, which can improve image quality in the moving video sequence.

Compound Motion Examples: Frame Jitter and Film Cadence

Embodiments of the invention are not limited to function with smooth motion. On the contrary, embodiments of the invention are well suited to function with compound motion, such as smooth motion combined with frame jitter and/or smooth motion combined with film cadence. Moreover, while the description herein refers to motion vectors, embodiments that function with compound motion are well suited to use any kind of motion estimate components.

As used herein, the term "frame jitter" may refer to essentially generalized motion that applies to the whole frames of a video sequence. Frame jitter may be measured by a variety of known techniques. In a moving image sequence, where frame jitter is known to be present and is measured, an embodiment removes a motion characteristic associated with the jitter, smoothes the motion estimate associated with the remaining motion characteristic from which the jitter characteristic has been removed, and then replaces the jitter characteristic to the smoothed motion estimate.

Figure 6:
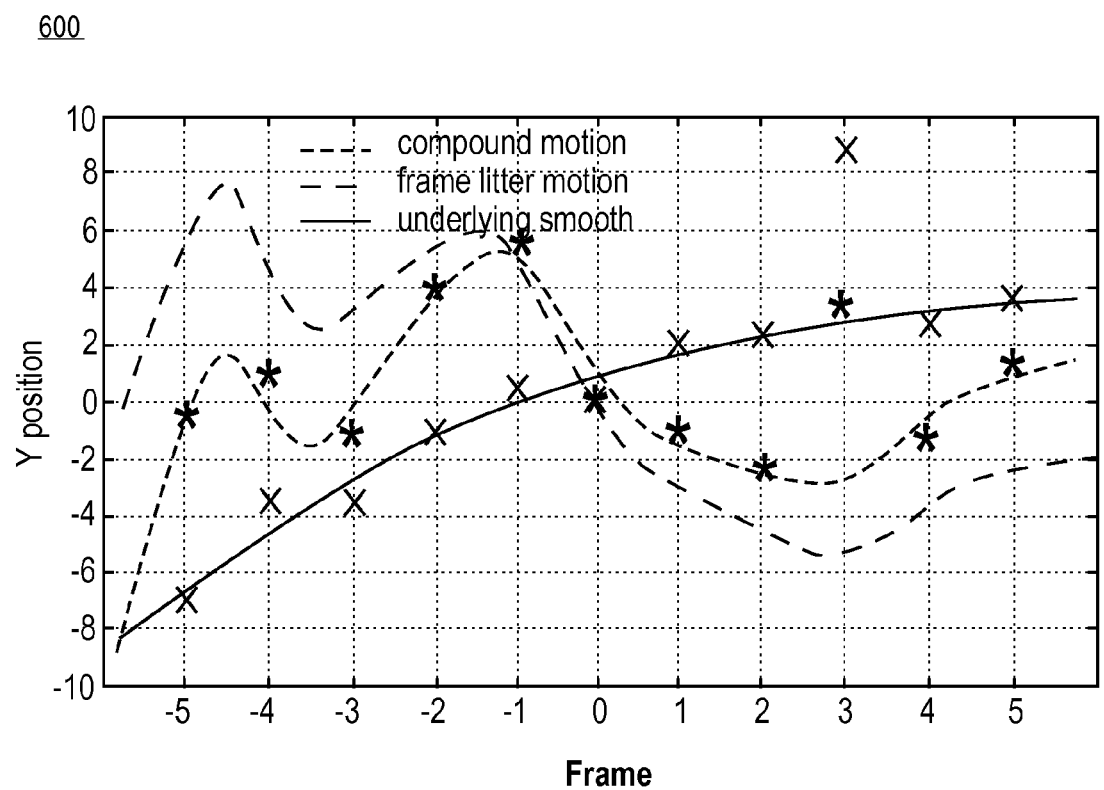
FIG. 6 depicts a plot of a motion vector component for a first example of compound motion, according to an embodiment of the invention.

FIG. 6 depicts a plot of a motion vector component 600 for a first example of compound motion, e.g., smooth motion combined with frame jitter, according to an embodiment. For simplicity, clarity and brevity, FIG. 6 depicts the y component of the motion vector (without showing a corresponding x component). The double-dashed curve represents the trajectory of the compound motion, including the frame jitter characteristic as well as the motion characteristic of the block within the frame. The star symbols represent positions found for the existing motion estimate. The dashed curve represents a trajectory associated with the frame jitter.

In an embodiment, the known frame jitter is subtracted from the motion vector (or other motion estimate) values. Upon subtracting the frame jitter from the motion vectors, the motion characteristic of the block within the frame remains free of the jitter characteristic and may be referred to herein as a jitter-free motion estimate. The jitter-free motion estimate may now be smoothed, as represented in FIG. 6 by the solid curve trajectory with values shown with the X symbols. Procedures such as those described with reference to FIG. 4 and FIG. 5 are executed in an embodiment to smooth the jitter-free motion estimate within the frame. Upon the smoothing, the frame jitter motion characteristic is added to the newly smoothed motion estimate to generate the compound motion estimate with an underlying smoothed motion characteristic.

Compound motion may also occur where smooth motion is combined with a film cadence, which is inserted into an image sequence by repeating frames. For example, where a 24 frame per second video input is converted to a 60 frame per second video output, a pair of input frames may be repeated to produce five (5) output frames. In this example, a first frame of the pair may be repeated three times and the second frame may be repeated twice. Such repetitiveness may be expected to continue for each pair of input frames. Film cadence may be known or measured by various techniques.

Figure 7:
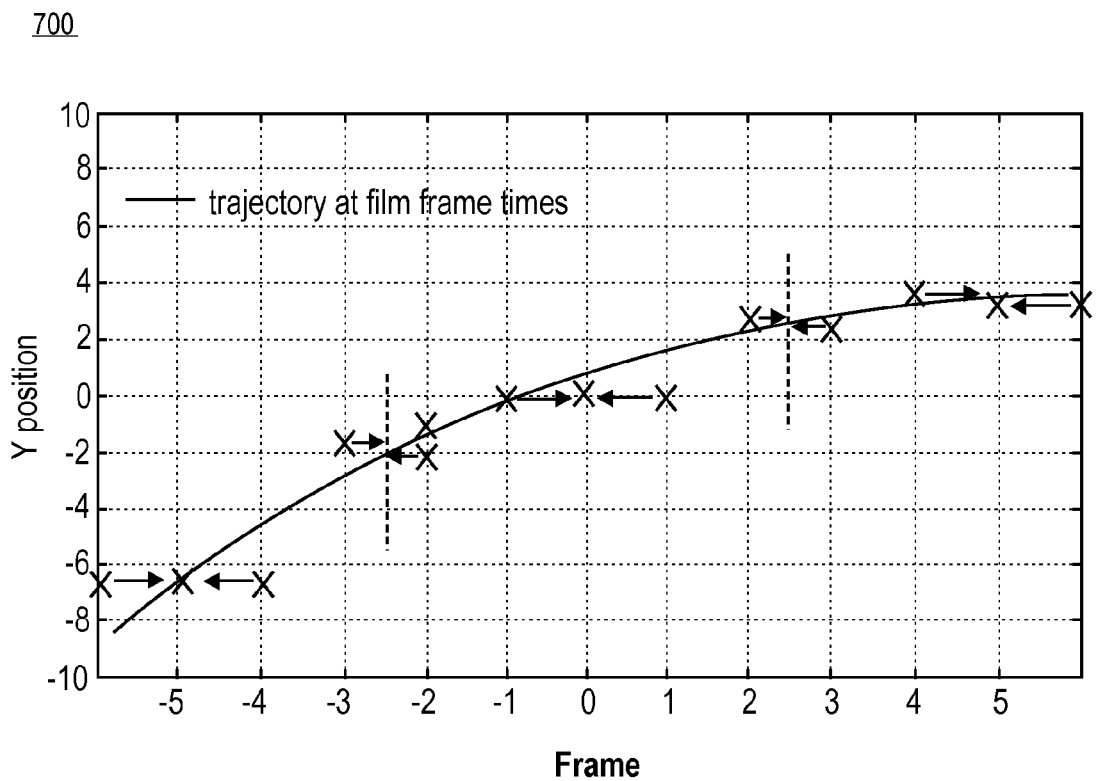
FIG. 7 depicts a plot of a motion vector component for a second example of compound motion, according to an embodiment of the invention.

FIG. 7 depicts a plot of a motion vector component 700 for a second example of compound motion, according to an embodiment. FIG. 7 shows smooth motion with a 24:60 film cadence present in the image sequence. For simplicity, clarity and brevity, the y component of a set of motion vectors, representative of any motion estimate, is shown in FIG. 7 (without showing a corresponding x component). The presence of the film cadence is demonstrable by observing the repeating positions of the frames.

Due to frame repetition, smoothing is delayed in an embodiment until the repeated frames are moved back to their original positions in time, for instance, by application of a inverse film cadence. In FIG. 7, the frame times to which the position values are moved are pointed to with arrows. Upon moving the values, procedures such as those described above with reference to FIG. 4 and FIG. 5 are applied to smooth the cadence-free motion estimate. Upon the smoothing, the film cadence is reapplied to the newly smoothed motion estimate to generate the compound motion estimate with an underlying smoothed motion characteristic.

Example Computer System Platform

Figure 8:
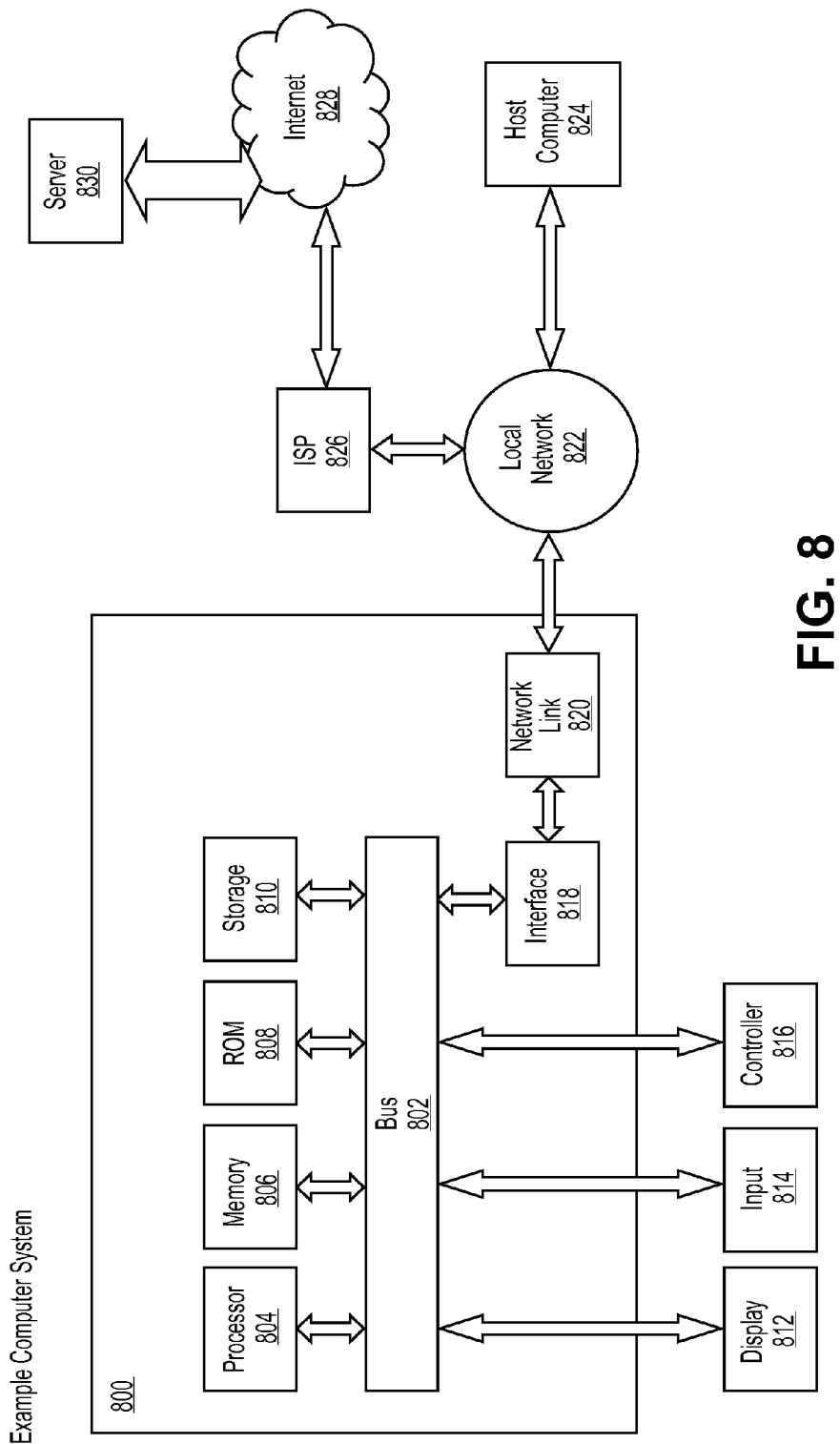
FIG. 8 depicts an example computer system platform, with which an embodiment of the invention may be practiced.

FIG. 8 depicts an example computer system 800 upon which an embodiment of the invention may be implemented. Computer system 800 includes a bus 802 or other communication mechanism for communicating information, and a processor 804 (which may represent one or more processors) coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic or optical disk, is provided and coupled to bus 802 for storing information and instructions.

Computer system 800 may be coupled via bus 802 to a display 812, such as a liquid crystal display (LCD), cathode ray tube (CRT), flat panel display, or a like monitor, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for smoothing a motion estimate. According to one embodiment of the invention, rewriting queries with remote objects is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein may refer to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and other conductors and fiber optics, including wires comprising bus 802. Transmission media can also take the form of acoustic or electromagnetic waves, such as those generated during radio and infrared data communications.

Common forms of computer-readable media include, for example, a floppy disk, a flexible disk, hard disk, magnetic tape, or any other magnetic medium, a CD-ROM, DVD or any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a digital subscriber line (DSL), cable or other modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for temporally smoothing a motion estimate, as described herein.

The received code may be executed by processor 804 as it is received, and/or stored in storage device 810, or other non-volatile storage for later execution. In this manner, computer system 800 may obtain application code in the form of a carrier wave.

Embodiments of the invention may be implemented in an apparatus such as a decoder and/or an encoder, which function to smooth a motion estimate as described with reference to FIG. 4 and/or FIG. 5, using components of example computer system 800. In various embodiments, the apparatus may be implemented with firmware associated with computer system 800 and/or with software executing therewith. In various embodiments, instructions for configuring the apparatus and/or for executing procedures described herein are encoded in one or more computer readable storage media, which are used by computer system 800.

In an embodiment, computer system 800 may be configured to include additional components with other functions. In another embodiment, computer system 800 may not include one or more of the components described and/or may be configured to achieve a function, described in relation to one or more of the components shown, with an external component, system or device. In an embodiment, one or more functions of computer system 800 are performed with an application specific integrated circuit (ASIC). In an embodiment, a function of an apparatus is achieved with the ASIC.

In an embodiment, computer system 800 and/or an apparatus configured therewith comprises an element of network 822 and/or internet 828. In an embodiment, computer system 800 and/or an apparatus configured therewith comprises a personal computer (PC), workstation computer or the like, a video editing and/or processing system, a mobile and/or network-capable computing and/or communication device such as a cellular telephone, personal digital assistant (PDA), a laptop or hand-held computer or the like, a television (TV), digital versatile disk (DVD) player, a player for high definition (HD) media such as HD-DVD, a player for other optically encoded media such as Blu-Ray disks (BD), a game playing device, a player for streaming media, a scientific, medical or other imaging device, or the like.

EXAMPLES

In an embodiment, a method comprises or a computer-readable medium carrying one or more sequences of instructions, which instructions, when executed by one or more processors, cause the one or more processors to carry out the steps of: for a set of frames that define a temporal window over a moving image sequence, accessing a motion estimate that describes a change to a region of a reference frame with respect to at least one frame, which is displaced within the set of frames from the reference frame over the temporal window; wherein the regions of the reference frame and the at least one frame contain at least a portion of an image feature; and smoothing the motion estimate over the temporal window.

In an embodiment, a method or computer-readable medium further comprises wherein the smoothing facilitates aligning, at least in part, the image feature within the set of frames.

In an embodiment, a method or computer-readable medium further comprises determining a compound motion component associated with the frames in the set of frames that further describes the change to the corresponding frame region; and concomitant with smoothing the motion estimate, compensating for the compound motion component.

In an embodiment, a method or computer-readable medium further comprises wherein the compound motion component comprises at least one of: a frame jitter characteristic associated with the frames of the moving image sequence; or a film cadence characteristic associated with the frames of the moving image sequence.

In an embodiment, a method or computer-readable medium further comprises wherein the motion estimate comprises a plurality of components, wherein the plurality of components comprises at least one of: a pair of orthogonally related vector components that describe a translational motion associated with one or more of the regions between one or more of the frames of the set; an angular component that describes a rotational motion associated with one or more regions between one or more of the frames of the set; or components that describe an affine motion associated with one or more regions between one or more of the frames of the set.

In an embodiment, a method or computer-readable medium further comprises wherein the corresponding regions of the first and second frames comprise a first region relationship of a plurality of region relationships; wherein the image feature is distributed, at least in part, over one or more plurality of region relationships; wherein the motion estimate comprises one of a plurality of motion estimates; wherein each of the motion estimates describe a change over one of the region relationships; and wherein the method further comprises: repeating the accessing step and the smoothing step for each of the motion estimates over each of the region relationships.

In an embodiment, a method or computer-readable medium further comprises wherein the motion estimate describes motion over the window with respect to an independent variable.

In an embodiment, a method or computer-readable medium further comprises wherein the independent variable relates to at least one of time, temperature or another property over which motion within the moving image sequence is associated.

In an embodiment, a method or computer-readable medium further comprises wherein the frames of the frame set are substantially spaced periodically over the window.

In an embodiment, a method or computer-readable medium further comprises wherein the frames of the frame set are spaced other than substantially periodically over the window.

In an embodiment, a method or computer-readable medium further comprises wherein the frame set of the moving image sequence comprises at least a third frame, which is displaced within the frame set from a first frame and from a second frame over at least a portion of the temporal window; and wherein the method further comprises: repeating the accessing step and the smoothing step with respect to each frame of the frame set.

In an embodiment, a method or computer-readable medium further comprises wherein the smoothing step comprises the steps of: computing a smoothed value for each component of the motion estimate that corresponds to temporally smoothing the motion estimate; comparing the smoothed value to a weighted estimation value that corresponds to each of the accessed motion estimates; wherein the weighted estimation value comprises motion estimates that are weighted according to a confidence level that relates to a degree of accuracy with which the motion estimates predict the change to a region of the first frame with respect to a corresponding region of the second frame; upon the computed smoothed value comparing with the weighted estimation value within an acceptable margin, selecting the smoothed value; and presenting the frames of the frame set within the moving image sequence according to the smoothed value.

In an embodiment, a method or computer-readable medium further comprises upon the computed smoothed value comparing with the weighted estimation value outside of the acceptable margin for one or more frames of a subset of the frame set, repeating the smoothing step for the one or more frames of the subset wherein the smoothing step further comprises: computing a subsequent smoothed value for each component of the motion estimate for the one or more frames of the subset wherein the subsequent smoothed value is constrained to a value between the original smoothed value and the weighted estimation value; upon the computed subsequent smoothed value comparing with the weighted estimation value within the acceptable margin, selecting the subsequent smoothed value; and presenting the one or more frames of the subset of frames of the frame set within the moving image sequence according to the subsequent smoothed value.

In an embodiment, an apparatus for processing a moving image sequence, comprising: at least one processor that facilitates alignment of an image feature of the moving image sequence; and a computer-readable medium comprising one or more stored sequences of instructions, which when executed by the at least one processor, cause the at least one processor to execute the steps of: for a set of frames that define a temporal window over a moving image sequence, accessing a motion estimate that describes a change to a region of a reference frame with respect to at least one frame, which is displaced within the frame set from the reference frame over the temporal window; wherein the regions of the reference frame and the at least one frame contain at least a portion of an image feature; and smoothing the motion estimate over the temporal window.

In an embodiment, an apparatus further comprising wherein the apparatus comprises at least one of: a computer; at least one of a video decoder or encoder; a television; a player application for at least one optically encoded medium; a player application for a streaming digital signal; a monitor for displaying information from an imaging application; a network element; a portable communication device; a medical imaging device; a scientific imaging device; a video editing system; a video processing system; or a game playing device.

In an embodiment, a system for processing a moving image sequence, which facilitates alignment of an image feature of the moving image sequence, the system comprising: for a set of frames that define a temporal window over a moving image sequence, means for accessing a motion estimate that describes a change to a region of a reference frame with respect to at least one frame, which is displaced within the set of frames from the reference frame over the temporal window; wherein the regions of the reference frame and the at least one frame contain at least a portion of an image feature; and means for smoothing the motion estimate over the temporal window.

In an embodiment, a method comprises or a computer-readable medium carrying one or more sequences of instructions, which instructions, when executed by one or more processors, cause the one or more processors to carry out the steps of: for a set of frames of a moving image sequence, accessing a motion estimate that associates each frame in the set with a value of an independent variable and, describes a change to a region of a frame in the set with respect to at least one other frame in the set as a function of the independent variable; and smoothing the motion estimate over the independent variable.

In an embodiment, a method or computer-readable medium further comprises for a region of a frame of a moving image sequence, accessing a motion estimate that describes the motion of the region over a subset of a set of frames and, associates each frame in the set with a value of an independent variable and, describes a change to the region of the frame in the set with respect to at least one other frame in the set as a function of the independent variable; and smoothing the motion estimate over the independent variable.

In an embodiment, a method or computer-readable medium further comprises wherein the smoothing facilitates aligning, at least in part, an image feature present in more than one frame in the set of frames.

In an embodiment, a method or computer-readable medium further comprises wherein the independent variable relates to at least one of time, frame number, distance, temperature or another property over which motion may be described.

In an embodiment, a method or computer-readable medium further comprises wherein the motion estimate comprises a plurality of component functions, wherein the plurality of component functions comprises at least one of: a translational component function that describes translational motion; an angular component function that describes rotational motion; affine component functions that describe affine motion; a color component function that describes a color change; or a resolution component function that describes a spatial resolution change.

In an embodiment, a method or computer-readable medium further comprises wherein the steps are repeated for all regions of a frame to smooth the entire motion estimate for the frame.

In an embodiment, a method or computer-readable medium further comprises wherein the steps are repeated for all frames of the moving image sequence to smooth the entire motion estimate for the sequence.

EXTENSIONS, EQUIVALENTS, ALTERNATIVES & MISCELLANEOUS

An example embodiment for temporally smoothing a motion estimate is thus described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:
    for a set of frames that define a temporal window over a moving image sequence, accessing a motion estimate that describes a change to a region of a reference frame with respect to at least one frame, which is displaced within the set of frames from the reference frame over the temporal window;
    wherein the motion estimate comprises at least one pair of orthogonally related motion vector components that describe a translational motion associated with one or more of the regions between one or more of the frames of the set;
    wherein the regions of the reference frame and the at least one frame contain at least a portion of an image feature; and
    smoothing the motion estimate over the temporal window, comprising:
        for each pair of the at least one pair of orthogonally related motion vector components of the motion estimate, computing in response to confidence levels a smoothed value that corresponds to temporally smoothing the motion estimate, wherein the confidence level relates to a degree of accuracy of computing the motion estimate; and
        replacing the motion estimate over the temporal window with the smoothed values.

2. The method as recited in claim 1 wherein the smoothing facilitates aligning, at least in part, the image feature within the set of frames.

3. The method as recited in claim 1, further comprising:
    determining a compound motion component associated with the frames in the set of frames that further describes the change to the corresponding frame region; and
    concomitant with smoothing the motion estimate, compensating for the compound motion component.

4. The method as recited in claim 3 wherein the compound motion component comprises at least one of:
    a frame jitter characteristic associated with the frames of the moving image sequence; or
    a film cadence characteristic associated with the frames of the moving image sequence.

5. The method as recited in claim 1 wherein the motion estimate comprises a plurality of components, wherein the plurality of components comprises at least one of:
    an angular component that describes a rotational motion associated with one or more regions between one or more of the frames of the set; or
    components that describe an affine motion associated with one or more regions between one or more of the frames of the set.

6. The method as recited in claim 1 wherein the corresponding regions of the first and second frames comprise a first region relationship of a plurality of region relationships;
    wherein the image feature is distributed, at least in part, over one or more plurality of region relationships;
    wherein the motion estimate comprises one of a plurality of motion estimates;
    wherein each of the motion estimates describe a change over one of the region relationships; and
    wherein the method further comprises: repeating the accessing step and the smoothing step for each of the motion estimates over each of the region relationships.

7. The method as recited in claim 1 wherein the motion estimate describes motion over the window with respect to an independent variable.

8. The method as recited in claim 7 wherein the independent variable relates to at least one of time, temperature or another property over which motion within the moving image sequence is associated.

9. The method as recited in claim 1 wherein the frames of the frame set are substantially spaced periodically over the window.

10. The method as recited in claim 1 wherein the frames of the frame set are spaced other than substantially periodically over the window.

11. The method as recited in claim 1 wherein the frame set of the moving image sequence comprises at least a third frame, which is displaced within the frame set from a first frame and from a second frame over at least a portion of the temporal window; and
wherein the method further comprises:
repeating the accessing step and the smoothing step with respect to each frame of the frame set.

12. The method as recited in claim 1, further comprising:
determining differences between the motion vector components of the motion estimate and the computed smoothed values over the temporal window;
wherein the step of replacing the motion estimate with the smoothed values replaces the motion estimate with the smoothed values upon determining that the differences are within an acceptable margin.

13. An apparatus for processing a moving image sequence, comprising:
at least one processor that facilitates alignment of an image feature of the moving image sequence; and
a computer-readable medium storing one or more sequences of instructions, which when executed by the at least one processor, cause the at least one processor to execute the steps of:
for a set of frames that define a temporal window over a moving image sequence, accessing a motion estimate that describes a change to a region of a reference frame with respect to at least one frame, which is displaced within the frame set from the reference frame over the temporal window;
wherein the motion estimate comprises at least one pair of orthogonally related motion vector components that describe a translational motion associated with one or more of the regions between one or more of the frames of the set;
wherein the regions of the reference frame and the at least one frame contain at least a portion of an image feature; and
smoothing the motion estimate over the temporal window, comprising:
for each pair of the at least one pair of orthogonally related motion vector components of the motion estimate, computing in response to confidence levels a smoothed value that corresponds to temporally smoothing the motion estimate, wherein the confidence level relates to a degree of accuracy of computing the motion estimate; and
replacing the motion estimate over the temporal window with the smoothed values.

14. The apparatus as recited in claim 13, wherein the apparatus comprises at least one of:
a computer;
at least one of a video decoder or encoder;
a television;
a player application for at least one optically encoded medium;
a player application for a streaming digital signal;
a monitor for displaying information from an imaging application;
a network element;
a portable communication device;
a medical imaging device;
a scientific imaging device;
a video editing system;
a video processing system;
or a game playing device.

15. A computer readable storage medium having encoded instructions which, when executed with one or more processors of a computer system, cause the processors to execute the steps of:
for a set of frames that define a temporal window over a moving image sequence, accessing a motion estimate that describes a change to a region of a reference frame with respect to at least one frame, which is displaced within the set of frames from the reference frame over the temporal window;
wherein the motion estimate comprises at least one pair of orthogonally related motion vector components that describe a translational motion associated with one or more of the regions between one or more of the frames of the set;
wherein the regions of the reference frame and the at least one frame contain at least a portion of an image feature; and
smoothing the motion estimate over the temporal window, comprising:
for each pair of the at least one pair of orthogonally related motion vector components of the motion estimate, computing in response to confidence levels a smoothed value that corresponds to temporally smoothing the motion estimate, wherein the confidence level relates to a degree of accuracy of computing the motion estimate; and
replacing the motion estimate over the temporal window with the smoothed values.

16. A system for processing a moving image sequence, which facilitates alignment of an image feature of the moving image sequence, the system comprising:
for a set of frames that define a temporal window over a moving image sequence, means for accessing a motion estimate that describes a change to a region of a reference frame with respect to at least one frame, which is displaced within the set of frames from the reference frame over the temporal window;
wherein the motion estimate comprises at least one pair of orthogonally related motion vector components that describe a translational motion associated with one or more of the regions between one or more of the frames of the set;
wherein the regions of the reference frame and the at least one frame contain at least a portion of an image feature; and
means for smoothing the motion estimate over the temporal window, comprising:
for each pair of the at least one pair of orthogonally related motion vector components of the motion estimate, means for computing in response to confidence levels a smoothed value that corresponds to temporally smoothing the motion estimate, wherein the confidence level relates to a degree of accuracy of computing the motion estimate; and means for replacing the motion estimate over the temporal window with the smoothed values.

17. A method, comprising the steps of:

for a region of a frame of a moving image sequence, accessing a motion estimate that describes the motion of the region over a subset of a set of frames and, associates each frame in the set with a value of an independent variable and, describes a change to the region of the frame in the set with respect to at least one other frame in the set as a function of the independent variable; and wherein the motion estimate comprises at least one pair of translational component functions that describe a translational motion associated with one or more of the regions between one or more of the frames of the set;

smoothing the motion estimate over the independent variable, comprising:

for each pair of the at least one pair of translational component functions of the motion estimate, computing in response to confidence levels a smoothed value that corresponds to temporally smoothing the motion estimate wherein the confidence level relates to a degree of accuracy of computing the motion estimate; and replacing the motion estimate over the temporal window with the smoothed values.

18. The method as recited in claim 17 wherein the smoothing facilitates aligning, at least in part, an image feature present in more than one frame in the set of frames.

19. The method as recited in claim 17 wherein the independent variable relates to at least one of time, frame number, distance, temperature or another property over which motion may be described.

20. The method as recited in claim 17 wherein the motion estimate comprises a plurality of component functions, wherein the plurality of component functions comprises at least one of:

an angular component function that describes rotational motion;

affine component functions that describe affine motion; a color component function that describes a color change; or a resolution component function that describes a spatial resolution change.

21. The method as recited in claim 17, wherein the steps are repeated for all regions of a frame to smooth the entire motion estimate for the frame.

22. The method as recited in claim 21, wherein the steps are repeated for all frames of the moving image sequence to smooth the entire motion estimate for the sequence.

* * * * *